United States Patent
Oh et al.

(10) Patent No.: US 9,241,196 B2
(45) Date of Patent: Jan. 19, 2016

(54) FRONT MODULE HAVING TRIPLEXER FOR MULTIMEDIA OVER COAX ALLIANCE

(71) Applicant: SAMSUNG ELECTRO-MECHANICS CO., LTD., Suwon (KR)

(72) Inventors: Ho Jin Oh, Suwon (KR); Akio Tadachi, Suwon (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 30 days.

(21) Appl. No.: 14/071,349

(22) Filed: Nov. 4, 2013

(65) Prior Publication Data
US 2014/0130108 A1 May 8, 2014

(30) Foreign Application Priority Data
Nov. 6, 2012 (KR) .......................... 10-2012-0125003

(51) Int. Cl.
*H04N 21/426* (2011.01)
*H04N 21/41* (2011.01)
*H04N 7/10* (2006.01)
*H04N 21/61* (2011.01)

(52) U.S. Cl.
CPC ........... *H04N 21/6168* (2013.01); *H04N 21/41* (2013.01); *H04N 21/426* (2013.01); *H04N 21/42676* (2013.01); *H04N 21/6118* (2013.01); *H04N 7/102* (2013.01); *H04N 7/106* (2013.01)

(58) Field of Classification Search
CPC . H04N 21/41; H04N 21/6168; H04N 21/426; H04N 21/4367; H04N 21/6118; H04N 7/102; H04N 7/104; H04N 7/106
See application file for complete search history.

(56) References Cited

U.S. PATENT DOCUMENTS

| | | | |
|---|---|---|---|
| 2007/0207747 A1* | 9/2007 | Johnson et al. | 455/78 |
| 2008/0175212 A1* | 7/2008 | Angell et al. | 370/338 |
| 2008/0187028 A1* | 8/2008 | Lida | 375/140 |
| 2010/0216413 A1* | 8/2010 | Khannur | 455/78 |
| 2011/0110385 A1* | 5/2011 | Gorostegui et al. | 370/497 |
| 2013/0002958 A1* | 1/2013 | Labro | 348/584 |

(Continued)

FOREIGN PATENT DOCUMENTS

| | | |
|---|---|---|
| JP | 2012-090128 | 5/2012 |
| KR | 10-2009-0067113 | 6/2009 |
| KR | 10-2012-0065602 A | 6/2012 |

OTHER PUBLICATIONS

Office action dated Dec. 23, 2013 from corresponding Korean Patent Application No. 10-2012-0125003 and its English summary provided by the clients.

*Primary Examiner* — Pinkal R Chokshi
(74) *Attorney, Agent, or Firm* — Ladas & Parry, LLP

(57) ABSTRACT

Disclosed herein is a front module having a triplexer. According to a preferred embodiment of the present invention, the front module includes: a triplexer receiving and distributing a MoCA receiving signal and a cable broadcasting signal from a coaxial cable and receiving the MoCA transmitting signal and outputting the received MoCA transmitting signal to the coaxial cable; a transceiver for MoCA removing and outputting noise from the MoCA receiving signal input through the triplexer and amplifying the MoCA transmitting signal input from the outside and providing the amplified MoCA transmitting signal to the triplexer; and a receiver for cable removing and outputting noise from the cable broadcasting signal input through the triplexer.

5 Claims, 2 Drawing Sheets

(56) References Cited

U.S. PATENT DOCUMENTS

| | | | |
|---|---|---|---|
| 2013/0091267 A1* | 4/2013 | Urban et al. | 709/224 |
| 2013/0128716 A1* | 5/2013 | Reddy et al. | 370/201 |
| 2013/0181789 A1* | 7/2013 | Rijssemus | 333/131 |
| 2014/0010269 A1* | 1/2014 | Ling et al. | 375/222 |
| 2015/0012648 A1* | 1/2015 | Testin | 709/224 |
| 2015/0195477 A1* | 7/2015 | White | 348/731 |

* cited by examiner

FRONT MODULE HAVING TRIPLEXER FOR MULTIMEDIA OVER COAX ALLIANCE

CROSS REFERENCE TO RELATED APPLICATION

This application claims the benefit of Korean Patent Application No. 10-2012-0125003, filed on Nov. 6, 2012, entitled "Front Module Having Triplexer For Multimedia Over Coax Alliance", which is hereby incorporated by reference in its entirety into this application.

BACKGROUND OF THE INVENTION

1. Technical Field

The present invention relates to a front module having a triplexer for multimedia over coax alliance.

2. Description of the Related Art

Generally, a home network means a network for providing communication between electronic devices included in the home by using predetermined communication types. In this case, the communication types, which include a wired communication type using a coaxial cable, and the like and a wireless communication type using Bluetooth, infrared rays, RF ID, and the like, may be used.

As the representative technology for a home network, there is multimedia over coax alliance (hereinafter, referred to as 'MoCA') which has been standardized recently.

The MoCA is a solution of allowing cable, satellite, and IP-network service providers around the world to convert a whole-home media distribution network on an existing coaxial wiring connection basis of subscribers.

In particular, a network (hereinafter, referred to as 'MoCA network') supporting the MoCA enables subscribers to safely access, store, and share various digital media contents which include HDTV programs, video on demand (VoD), digital video recorder (DVR), Internet contents, video, music, photographs, VoIP, and the like.

That is, when a media center receives desired contents from a content supply server, the MoCA network may store and manage the desired contents and hold a digital right and allow other media applications in the home to share the corresponding contents.

Therefore, the MoCA includes functions of watching and storing digital contents while providing saving of cost and convenience of installation as well as satisfying an increasing demand for a whole-home DVR service.

The MoCA network providing the above-mentioned convenience interconnects subscriber terminals which are installed at different places. Herein, the subscriber terminal includes TVs which are installed at places, such as a living room, a media room, and a bedroom in the home, and set top boxes which are installed at each TV.

In case of the set top box, the related art uses a triplexer installed at the front end thereof so as to receive cable broadcasting and transmit and receive a MoCA signal.

In this case, since the triplexer is separately selected and used regardless of close connection with the set top box, it is difficult to match the triplexer with a low-noise amplifier for a cable and a low-noise amplifier/power amplifier for MoCA at the time of designing the set top box.

RELATED ART DOCUMENT

Patent Document (Patent Document 1) Korean Patent Laid-Open Publication No. 2012-0065602

SUMMARY OF THE INVENTION

The present invention has been made in an effort to provide a front module having a triplexer for multimedia over coax alliance (MoCA) capable of matching the triplexer with a low-noise amplifier for cable and a low-noise amplifier/power amplifier for MoCA by allowing the triplexer to be embedded therein.

According to a preferred embodiment of the present invention, there is provided a front module, including: a triplexer receiving and distributing a MoCA receiving signal and a cable broadcasting signal from a coaxial cable and receiving the MoCA transmitting signal and outputting the received MoCA transmitting signal to the coaxial cable; a transceiver for MoCA removing and outputting noise from the MoCA receiving signal input through the triplexer and amplifying the MoCA transmitting signal input from the outside and providing the amplified MoCA transmitting signal to the triplexer; and a receiver for cable removing and outputting noise from the cable broadcasting signal input through the triplexer.

The front module may further include a bypass unit receiving and distributing the MoCA receiving signal and the cable broadcasting signal input through the triplexer and outputting the distributed signals to the outside.

The bypass unit may include a balun for bypass which distributes the MoCA receiving signal and the cable broadcasting signal input through the triplexer depending on a predetermined ratio and outputs the distributed signals to the outside.

The transceiver for MoCA may include a low-noise amplifier for MoCA which removes noise from the MoCA receiving signal input from the triplexer and then outputs the MoCA receiving signal to the outside; and a power amplifier which power-amplifies the MoCA transmitting signal input from the outside and outputs the MoCA transmitting signal to the triplexer.

The transceiver for MoCA may include a balun for MoCA which distributes a MoCA signal input from the triplexer depending on a predetermined ratio and outputs the distributed MoCA signal to the low-noise amplifier for MoCA and outputs the signal input from the power amplifier to the triplexer.

The transceiver for MoCA may include a circulator which transmits a signal input through the balun for MoCA to the low-noise amplifier for MoCA or transmits the signal provided from the power amplifier to the balun.

The receiver for cable may include a low-noise amplifier for cable which removes noise from the cable broadcasting signal input through the triplexer and then outputs the cable broadcasting signal to the outside.

The receiver for cable may include a balun for cable which distributes the cable broadcasting signal input from the triplexer depending on a predetermined ratio and outputs the distributed cable broadcasting signal to the low-noise amplifier for cable.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
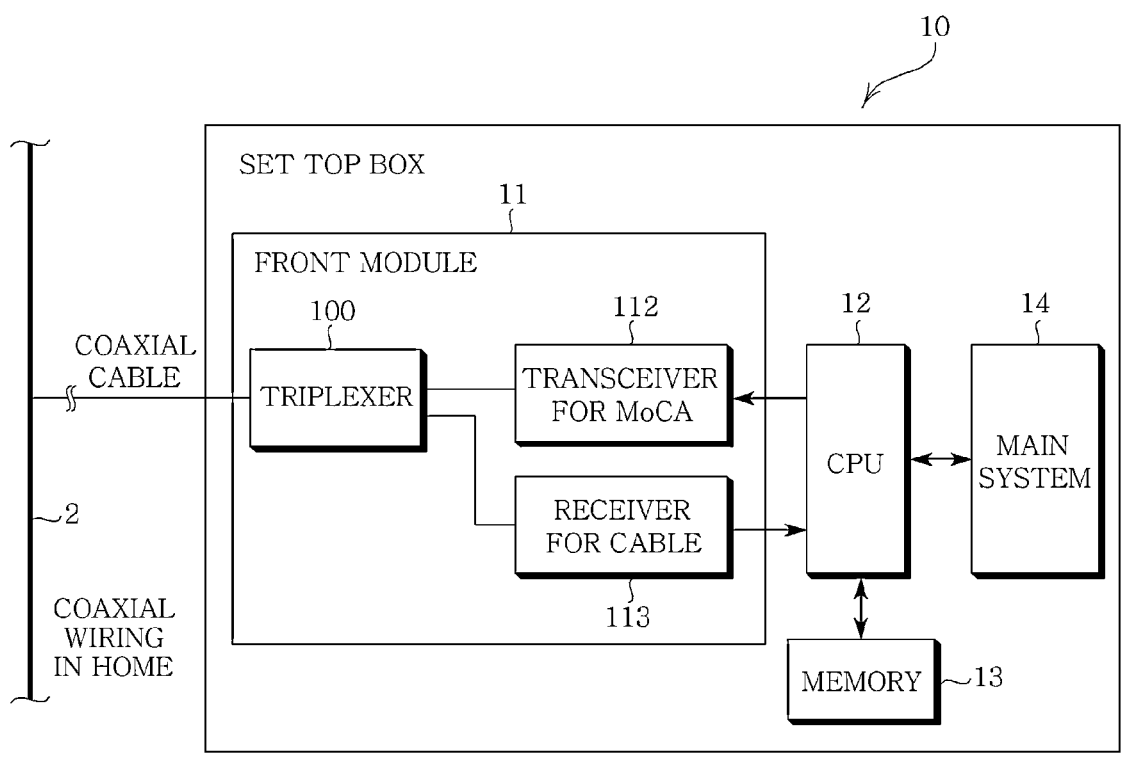
FIG. 1 is a diagram illustrating a configuration of a set top box including a front module having a triplexer according to one preferred embodiment of the present invention.

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second", "one side", "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the attached drawings.

FIG. 1 is a diagram illustrating a configuration of a set top box including a front module having a triplexer according to one preferred embodiment of the present invention.

Referring to FIG. 1, a set top box 10 including the front module having a triplexer according to the preferred embodiment of the present invention is configured to include a front module 11, a CPU 12, a memory 13, and a main system 14. Further, the CPU 12 is an example of a 'control unit' of the present invention. Further, the memory 13 is an example of a 'storage unit' of the present invention.

The front module 11 is connected to a coaxial wiring 2 in the home through a coaxial cable. Further, the front module 11 is configured to perform communication based on a MoCA standard as above described.

Further, the front module 11 is configured to include a triplexer 111, a transceiver for MoCA 112, and a receiver for cable 113.

The triplexer 111 provides a connection between the coaxial cable and the transceiver for MoCA 112 and a connection between the coaxial cable and the receiver for cable 113.

The transceiver for MoCA 112 is configured to be able to transmit a network signal based on a MoCA standard.

Further, the transceiver for MoCA 112 is configured to be able to receive the network signal based on a MoCA standard through the coaxial cable.

Further, the receiver for cable 113 is configured to be able to receive a cable television broadcasting signal transmitted by a cable television station.

The CPU 12 is configured to be able to control the entire set top box 10. The memory 13 is configured to store various programs executed by the CPU 12. Further, the memory 13 is configured to store frequency information on the cable television broadcasting signal.

The main system 14 is configured of various devices to exhibit a function of the set top box 10. For example, the main system 14 is configured of a signal processor, and the like, which performs descrambling processing (release processing of viewing limit) of the cable television broadcasting signal.

When the set top box 10 including the front module having a triplexer configured as described above receives a MoCA signal and a cable broadcasting signal through an input terminal (RF IN), the triplexer 111 transmits the MoCA signal to the transceiver for MoCA 112, which is in turn output to the outside.

Unlike this, when a transmitting signal is input from the outside, the transceiver for MoCA 112 amplifies the input signal and transmits the amplified signal to the triplexer 111, which is in turn transmitted to the outside.

Further, when the set top box 10 including the front module having a triplexer configured as described above receives the MoCA signal and the cable broadcasting signal through the input terminal (RF IN), the triplexer 111 transmits the cable broadcasting signal to the receiver for cable 113 and removes noise from the cable broadcasting signal and then outputs the cable broadcasting signal to the outside.

Meanwhile, the CPU 12 is configured to perform a control to build a home network on a coaxial wiring in the home when there is an empty frequency band having a bandwidth larger by a predetermined bandwidth than a bandwidth of a network signal, in a frequency band allocated to transmit the cable television broadcasting signal on the coaxial line 2 in the home.

Further, the CPU 12 is configured to determine whether there is an empty frequency band having a bandwidth of a predetermined bandwidth or more in a frequency band to transmit the cable television broadcasting signal on the coaxial wiring 2 in the home, based on the frequency information obtained by acquiring the frequency information on the cable television broadcasting signal from the cable television station through the receiver for cable 113. Herein, the frequency information on the cable television broadcasting signal is a list of a frequency band which is used in each channel of the cable television broadcasting signal. The frequency information of the cable television broadcasting signal is transmitted by a head end (apparatus for transmitting various data to subscribers of cable television broadcasting service) which is installed in the cable television station.

According to the preferred embodiment of the present invention as described above, it is possible to allow designers of the set top box to obtain time and cost saving effects by developing the front module 11 which matches the triplexer 111 with the transceiver for MoCA 112 and the receiver for cable 113 which are installed at a back end thereof.

Figure 2:
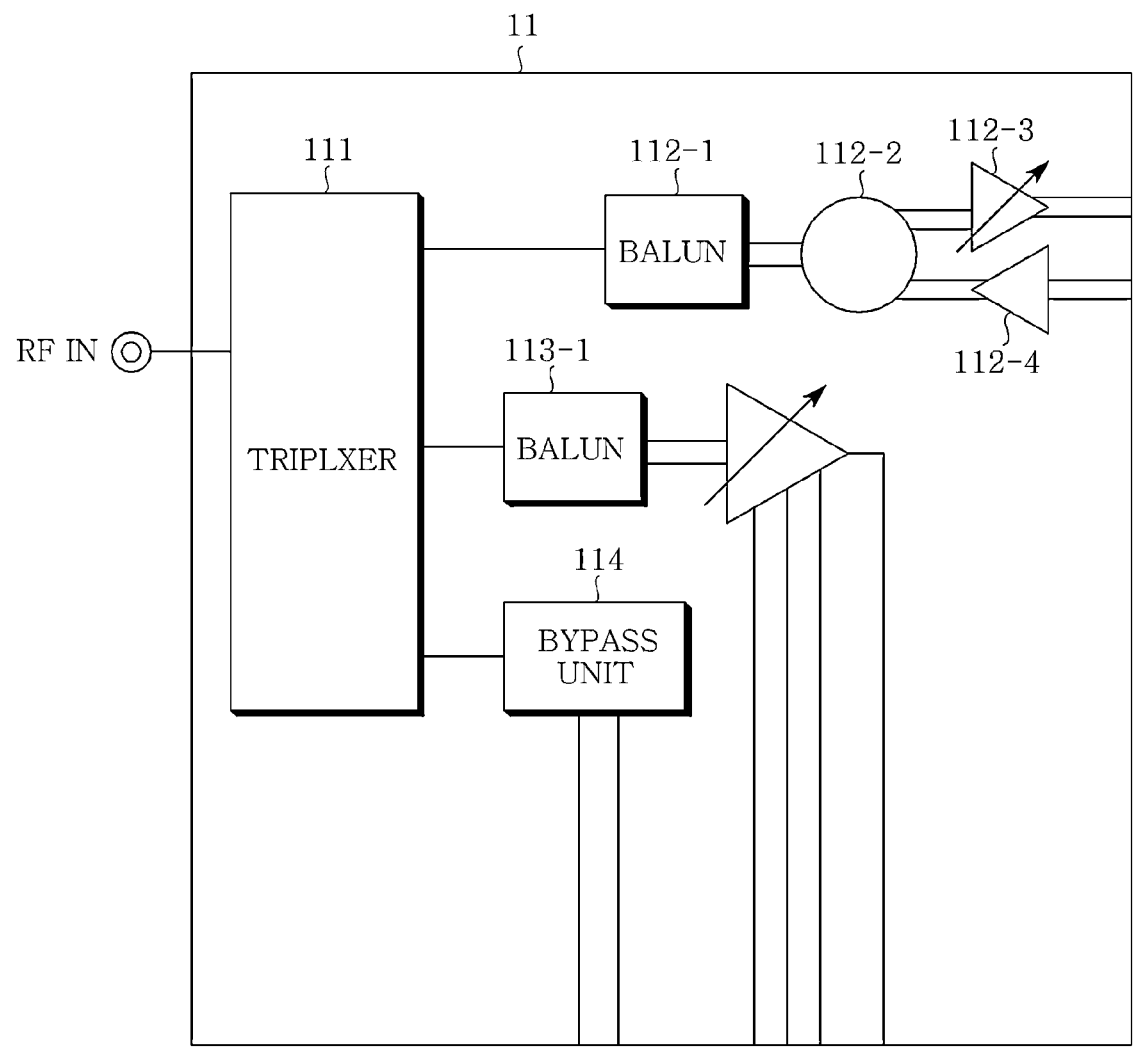
FIG. 2 is a detailed configuration diagram of the front module having the triplexer of FIG. 1.

FIG. 2 is a detailed configuration diagram of the front module having the triplexer of FIG. 1.

Referring to FIG. 2, the front module having a triplexer of FIG. 1 includes the triplexer 111, the transceiver for MoCA 112, and the receiver for cable 113 and further includes a bypass unit 114.

Herein, the transceiver for MoCA 112 is configured to include a balun for MoCA 112-1, a circulator 112-2, a low-noise amplifier for MoCA 112-3, and a power amplifier 112-4.

The balun for MoCA 112-1 distributes and outputs the MoCA signal input from the triplexer 111 into two depending to a predetermined ratio. Unlike this, the balun for MoCA 112-1 integrates a signal input from the circulator 112-2 into a single signal and outputs the integrated signal.

Further, the circulator 112-2 transmits the signal input through the balun for MoCA 112-1 to the low-noise amplifier for MoCA 112-3 or transmits a signal provided from the power amplifier 112-4 to the balun for MoCA 112-1, which is in turn transmitted to the triplexer 111.

Next, the low-noise amplifier for MoCA 112-3 removes a low-noise noise signal from the input MoCA signal. When the low-noise amplifier for MoCA 112-3 is turned on, the low-noise amplifier for MoCA 112-3 amplifies and outputs the input MoCA signal and when the low-noise amplifier for MoCA 112-3 is turned off, the low-noise amplifier for MoCA 112-3 attenuates and outputs the input MoCA signal at a unique attenuation factor.

Meanwhile, the receiver for cable 113 is configured to include a balun for cable 113-1 and a low-noise amplifier for cable 113-2.

The balun for cable 113-1 distributes and outputs the cable broadcasting signal input from the triplexer 111 into two depending to a predetermined ratio.

Next, the low-noise amplifier for cable 113-2 removes a low-noise noise signal from the input cable broadcasting signal. When the low-noise amplifier for cable 113-2 is turned on, the low-noise amplifier for cable 113-2 amplifies and outputs the input cable broadcasting signal and when the low-noise amplifier for cable 113-2 is turned off, the low-noise amplifier for cable 113-2 attenuates and outputs the input cable broadcasting signal at a unique attenuation factor.

Meanwhile, the additionally included bypass unit 114 is configured of a balun for 1:1 bypass and bypasses the signal input through the triplexer 111 so as to use external apparatuses.

When the front module having a triplexer configured as described above receives the MoCA signal and the cable broadcasting signal through the input terminal RF IN, the triplexer 111 transmits the MoCA signal to the balun for MoCA 112-1 of the transceiver for MoCA 112 and removes noise from the MoCA signal through the low-noise amplifier for MoCA 112-3 via the circulator 112-2 and then outputs the MoCA signal to the outside.

Unlike this, when the transmitting signal is input from the outside, the transmitting signal is amplified through the power amplifier 112-4 and then is transmitted to the triplexer 111 through the circulator 112-2, which is in turn is transmitted to the outside.

Further, when the front module having a triplexer configured as described above receives the MoCA signal and the cable broadcasting signal through the input terminal RF IN, the triplexer 111 transmits the cable broadcasting signal to the balun for cable 113-1 of the receiver for cable 113 and removes noise from the cable broadcasting signal through the low-noise amplifier for cable 113-2 and then outputs the cable broadcasting signal to the outside.

As set forth above, according to the preferred embodiments of the present invention, it is possible to allow the designers of the set top box to obtain the time and cost saving effects by developing the front module which matches the triplexer with the low-noise amplifier for cable broadcasting and the low-noise amplifier/power amplifier for transmitting/receiving MoCA at the back end thereof.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A front module, comprising:
   a triplexer receiving and distributing a Multimedia over Coax Alliance (MoCA) receiving signal and a cable broadcasting signal from a coaxial cable and receiving a MoCA transmitting signal and outputting the received MoCA transmitting signal to the coaxial cable;
   a transceiver for MoCA removing and outputting noise from the MoCA receiving signal input through the triplexer and amplifying the MoCA transmitting signal input from an outside and providing the amplified MoCA transmitting signal to the triplexer; and
   a receiver for cable removing and outputting noise from the cable broadcasting signal input through the triplexer,
   wherein the transceiver for MoCA includes:
      a low-noise amplifier for MoCA which removes noise from the MoCA receiving signal input from the triplexer and then outputs the MoCA receiving signal to the outside;
      a power amplifier which power-amplifies the MoCA transmitting signal input from the outside and outputs the MoCA transmitting signal to the triplexer;
      a balun for MoCA which distributes a MoCA signal input from the triplexer depending on a predetermined ratio and outputs the distributed MoCA signal to the low-noise amplifier for MoCA and outputs the signal input from the power amplifier to the triplexer; and
      a circulator which transmits a signal input through the balun for MoCA to the low-noise amplifier for MoCA and transmits the signal provided from the power amplifier to the balun.

2. The front module as set forth in claim 1, further comprising:
   a bypass unit receiving and distributing the MoCA receiving signal and the cable broadcasting signal input through the triplexer and outputting the distributed signals to the outside.

3. The front module as set forth in claim 2, wherein the bypass unit includes a balun for bypass which distributes the MoCA receiving signal and the cable broadcasting signal input through the triplexer depending on a predetermined ratio and outputs the distributed signals to the outside.

4. The front module as set forth in claim 1, wherein the receiver for cable includes a low-noise amplifier for cable which removes noise from the cable broadcasting signal input through the triplexer and then outputs the cable broadcasting signal to the outside.

5. The front module as set forth in claim 4, wherein the receiver for cable includes a balun for cable which distributes the cable broadcasting signal input from the triplexer depending on a predetermined ratio and outputs the distributed cable broadcasting signal to the low-noise amplifier for cable.

* * * * *